United States Patent [19]

Fomenko et al.

[11] 3,818,126

[45] June 18, 1974

[54] FACSIMILE SYSTEM

[75] Inventors: Sergei M. Fomenko, Woodland Hills; Frank B. Coker, Glendale; Frank W. Hauser, Santa Monica; Alex M. Muller, Palos Verdes; Remy J. Smith, Tujunga; Theodore Winston, Burbank, all of Calif.

[73] Assignee: Telautograph Corporation, Los Angeles, Calif.

[22] Filed: Aug. 23, 1972

[21] Appl. No.: 283,031

[52] U.S. Cl. ............... 178/6, 178/7.6, 178/DIG. 27, 346/74 P, 346/76 L, 355/28

[51] Int. Cl. ..... H04n 1/12, H04n 1/24, G03b 27/10

[58] Field of Search. 178/6, 6.7 R, 69.5 F, DIG. 27, 178/7.6; 346/74 ES, 74 CR, 74 P, 76 L; 355/20, 28

[56] References Cited

UNITED STATES PATENTS

| | | | |
|---|---|---|---|
| 3,422,218 | 1/1969 | Byer | 178/6.7 R |
| 3,461,229 | 8/1969 | Oppenheimer | 178/6.7 R |
| 3,493,754 | 2/1970 | Black | 178/6.7 R |
| 3,557,675 | 1/1971 | Koll | 355/28 |
| 3,593,151 | 7/1971 | Veale | 178/6 |
| 3,603,727 | 9/1971 | Kinugawa | 178/6.7 R |
| 3,614,306 | 10/1971 | Goldberg | 178/6 |
| 3,622,703 | 11/1971 | Ricketts | 178/69.5 F |
| 3,665,486 | 5/1972 | Sato | 346/74 CR |
| 3,749,836 | 7/1973 | Hayami | 178/DIG. 3 |

*Primary Examiner*—Howard W. Britton

*Attorney, Agent, or Firm*—Lindenberg, Freilich & Wasserman

[57] ABSTRACT

A facsimile system is disclosed comprising a single unit of modular design at each of the transmitter and receiver stations. Each unit is convertable to operate in either a transmit mode or a receive mode or both, in which case the unit is a transceiver. Common optics, including a single galvanometer, is used for both modes. When the leading edge of an input copy, inserted either manually or automatically, is sensed the unit transmits a carrier of a first frequency modulated by sync pulses during a first selected period to the receiver station. Thereafter, video, derived from scanning the input copy, is transmitted on carrier of a second frequency until the trailing edge of the input copy passes a scan station. Thereafter, the carrier of the first frequency is transmitted during a fixed second selected period. In the receiver station, which does not require attendance, the sync pulses received during the first period on the carrier of the first frequency are used for galvanometer synchronization. When the carrier of the second frequency is received the leading portion of a roll of light exposable paper is advanced passed a print station. The received video modulates a laser beam which is reflected to the paper at the print station by the galvanometer. The paper advances passed the print station whereat it is exposed as long as the carrier is of said second frequency. When the frequency changes back to the first frequency the exposed paper portion is cut from the rest of the roll and is fed to a developing unit at a controlled uniform rate.

37 Claims, 13 Drawing Figures

FACSIMILE SYSTEM

BACKGROUND OF THE INVENTION

1. Field of the Invention

The present invention is directed generally to the transfer of graphic information and, more particularly, to a new facsimile system for transferring graphic information from one location to another.

2. Description of the Prior Art

The term "facsimile" generally refers to a process in which graphic information is converted into electrical signals by a transmitter unit at a transmitter station. The signals are transmitted to a receiver station wherein the electrical signals are used to reproduce the originally-transmitted graphic information. Generally, the graphic information is in the form of typed, printed or written alpha-numeric characters, graphs or various patterns on a sheet of paper which is illuminated by an appropriate light source. The illuminated sheet is scanned optically and the light reflected from the light and dark areas of the paper is directed to a photosensitive device, wherein they are converted into electrical signals. These signals are transmitted to a receiver station wherein they are used in a receiver unit to reproduce the original information on an appropriate medium, such as a light sensitive paper which, after exposure, is developed to produce the original information.

Various facsimile systems have been described in the literature, and some systems have actually been constructed and operated, with only limited degrees of success. Known prior systems are characterized by several significant disadvantages. These include high cost, low reliability and limited speed. They are relatively complex, and include parts which tend to wear out as well as parts which necessitate frequent adjustments and maintenance. Consequently frequent shutdowns of the systems are experienced which limit their availability to their intended users. Also, in prior art systems the synchronization of the receiver unit with the transmitter unit to insure proper reproduction of the graphic information presents a major problem, often requiring lengthy synchronization periods before the two units are in proper phase for satisfactory operation. Consequently, the time required to reproduce the graphic information is increased which effectively limits the system's efficiency. Furthermore, in some prior art receiver units the reproduction process is generally quite messy requiring the handling of various troublesome and expensive chemicals. Also in facsimile receivers using electrosensitive paper unpleasant odors and other undesired effects are produced.

In addition to the aforedescribed undesired properties of proir art systems, one of their major disadvantages is the requirement of operator attendance during operation. In all prior art systems an operator must attend the receiver unit for information to be received, while in many systems the same requirement also exists for the transmitter unit. Generally, sheets of paper on which the information is to be reproduced or from which information is to be received must be inserted manually into the receiver unit or the transmitter unit, one sheet at a time. In some systems the receiver unit operator has to be called to prepare the receiver unit before the information can be received thereby. Thus, during the operation of such systems operator attendance is an absolute requirement, which greatly increases system operating cost. In addition, in most prior art systems the reproduced copy, i.e., the sheet of paper on which the information is produced is not necessarily of the same size as the copy containing the transmitted information. Generally, the reproduced copy includes a useless leading portion, known as a leader, which in most cases has to be severed from the reproduced copy.

It is the above discussed disadvantages which are the main reasons for the limited use of facsimile systems to date, although those familiar with the art are well aware of many applications for such systems. For example, due to the ever-rising cost of clerical labor, mailing costs and delayed mail deliveries, a highly reliable, easy to operate and relatively inexpensive facsimile system would find widespread use in both the private commercial and government sectors.

OBJECTS OF THE INVENTION

It is a primary object of the present invention to provide a new improved facsimile system.

Another object of the invention is to provide a new, highly reliable facsimile system with substantially instantaneous synchronization between the transmitter and receiver units.

Another object of the invention is to provide a receiver unit in a facsimile system which does not require operator attendance and which provides leaderless output copies.

A further object of the invention is to provide a new facsimile system which exhibits high reliability to minimize shutdown time and high degree of flexibility and adaptability for future requirements.

Yet a further object of the invention is to provide a reasonably priced facsimile system which is easy and convenient to operate, highly reliable in which each unit originally installed in a station to either transmit or receive information is easily modifiable to perform both functions at its installed location.

A further object of the present invention is to provide a new facsimile system with a highly reliable single transmit-receiver unit (transceiver) at either or both stations.

Yet a further object of the present invention is to provide a new facsimile system capable of automatically transmitting information on successive copies and of automatically producing leaderless copies without operator attendance at either the transmitter and/or receiver unit.

These and other objects of the invention are achieved by providing a facsimile system in which at each station a single unit of modular design is installed. Permanently installed in the unit are all the parts which are required for either transmitting or receiving information. In addition, the unit is designed to accommodate pluggable transmitter and receiver modules to convert the unit into a transmitter or a receiver unit. In case both transmitter and receiver modules are plugged in, the unit serves as a transceiver.

The basic unit incorporates an optical assembly with a single galvanometer (galvo). In the transmitter unit, hereafter referred to as the transmit mode, the optical assembly is used to scan the graphic information on an input copy which is illuminated by light from an appropriate source at a scan station. The light, reflected by the graphic information, is directed by the optical assembly to a photomultiplier. Therein it is converted into electrical signals, hereafter referred to as video signals or simply video, which together with appropriate synchronizing pulses are transmitted to the receiver unit in the receiver station. Therein, while operating in the receiver mode, the received video is used to modulate a laser whose light output is directed to the optical assembly and by means of the single galvanometer to a print station, wherein the light exposes a medium on which the graphic information is reproduced. The received synchronizing pulses are used to generate local synchronizing pulses for galvanometer and laser control, as will be explained hereafter.

The same identical optical assembly with the single galvanometer is used in both the transmitter and receiver units. In a preferred embodiment all parts of the optical assembly except galvo mirror are nonmoveable, thereby greatly increasing the system's reliability. Also, to optimize the system design, common electronic synchronizing circuitry; is used to produce the synchronizing pulses in either of the two modes of operation. All parts which are required for either one of the two modes are permanently installed in the basic unit, while the parts needed for only either the transmit or receive modes are mounted on pluggable or insertable modules. The modules which may include one or more modular sections contain only those parts which are required for their particular mode of operation.

Any basic unit may be modified to operate in either of both modes by inserting therein the proper modular sections. For example, if the basic unit operates as a transmitter unit and it is desired to modify it into a transceiver, since the optical assembly and the synchronizing circuitry is already in the basic unit all that is required to complete the modifications is to plug in the receiver modules. These include receiving circuitry, capable of extracting the received video and synchronizing pulses from the received signals, the laser and its associated circuitry and the print station equipment. Likewise, if the basic unit already functions as a receiver unit it may be modified into a transceiver by adding transmitter modules, which include the parts which move the medium with the graphic information in the scan station at which the information is to be scanned, the photomultiplier and circuitry which receives the synchronizing pulses and the video and conditions them for transmission to a receiver unit.

Clearly when the unit operates as a transceiver the optical assembly and the synchronizing circuitry is used for both transmission and reception purposes. Thus, the number of components as compared with two separate units is greatly reduced thereby reducing system cost, probability of breakdown and maintenance requirements, all of which increase the potential usefulness of the system. As will be detailed in the following description synchronizing techniques are employed which minimize the time required for the synchronization of the transmitter and receiver units. Also, substantially wear-proof parts are incorporated to further increase the system's reliability and reduce costly and interrupting maintenance requirements.

The novel receiver unit of the present invention includes a roll of light exposable paper loaded in a cassette rather than separate sheets of paper. The receiver unit includes circuitry to be described hereafter in detail, to enable the unit to produce leaderless copies without any operator attendance except for cassette reloading. By attaching a paper stack feeder to the transmit unit, information on successive input copies may be transmitted automatically without operator presence.

The novel features of the invention are set forth with particularity in the appended claims. The invention will best be understood from the following description when read in conjunction with the accompanying drawings.

DESCRIPTION OF THE PREFERRED EMBODIMENTS

The present invention will be described in connection with an exemplary embodiment, which will be presented for explanatory purposes, rather than to limit the invention thereto. The embodiment is assumed to comprise a transceiver unit, or simply a transceiver. The transceiver is capable of transmitting graphic information, consisting of characters, such as alphanumeric characters printed on a sheet of paper, hereafter referred to as an input copy, to another location wherein the characters are reproduced on an output copy. In the present invention, the transceiver is always in a standby receive mode, ready to receive signals transmitted from another location, except when an input copy is inserted into the transceiver for transmitting the characters thereon to another location.

Attention is first directed to FIGS. 1, 2, and 3 in connection with which an optical assembly, incorporated in the transceiver will be described. Therein, and in the rest of the figures, similar elements will be identified by like designations. Breifly, in the transmit mode, the function of the opitcal assembly is to direct light which is reflected from successive strips of the input copy to a light sensitive device which converts the reflected light into electrical signals, hereafter referred to as video, for transmission to another location. In the receive mode, the optical assembly is used to direct light from a video modulated laser to a print station, whereat a light sensitive paper is exposed by the light directed thereto. The paper, after exposure, is developed to produce output copy which is a facsimile of the input copy in another location from which the video signals were received.

Figure 1:
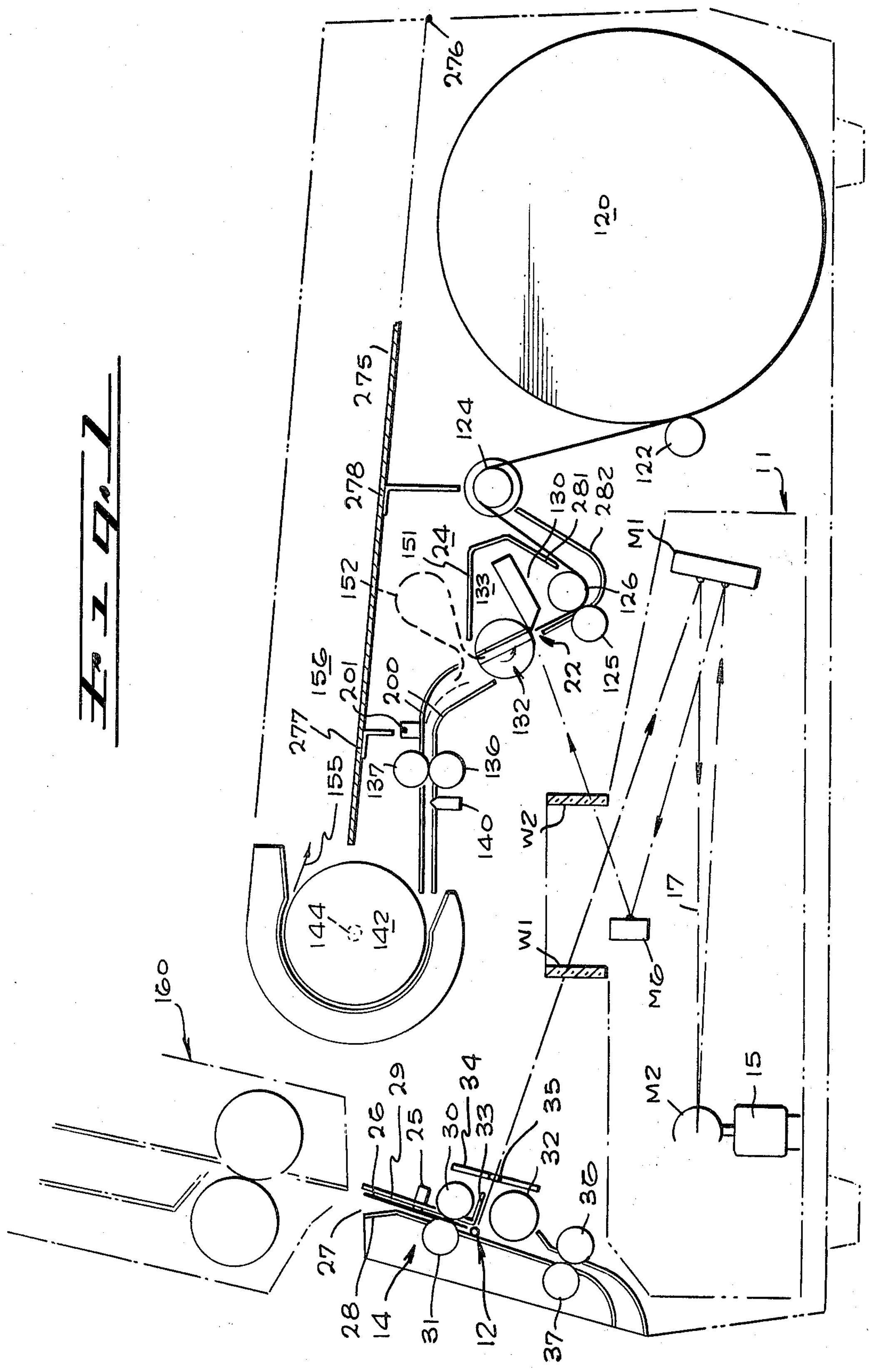
FIG. 1 is a cross-sectional view useful in explaining several basic modules and the optical assembly of the present invention.
Figure 2:
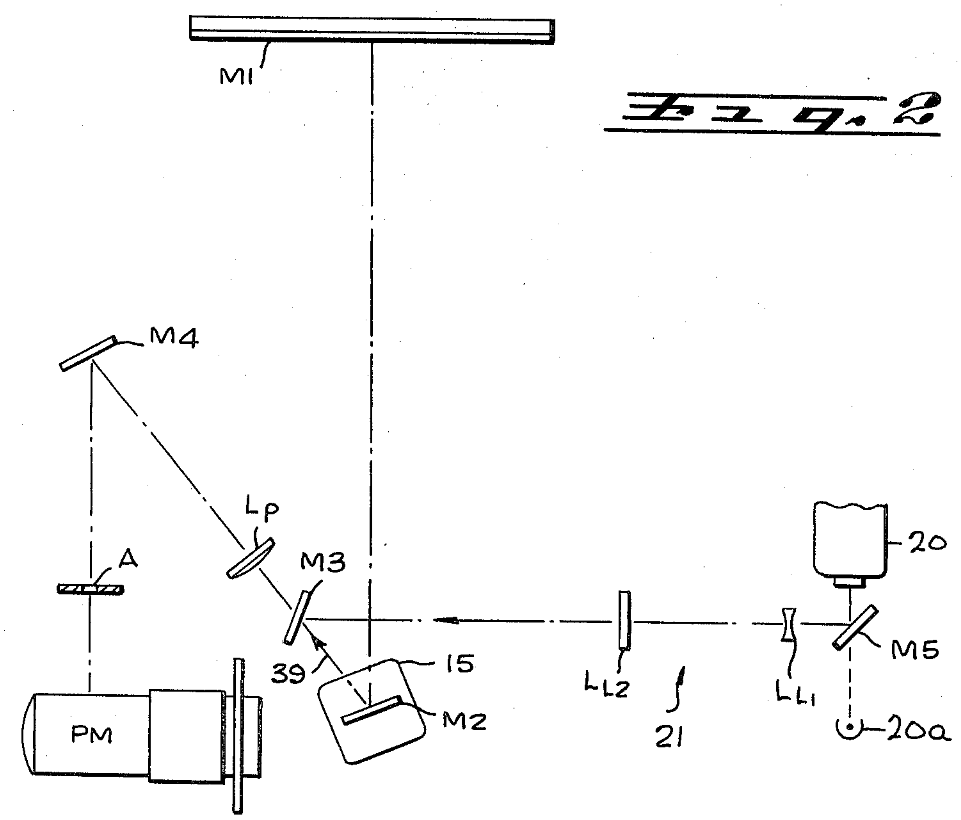
FIGS. 2 and 3 are diagrams useful in explaining the optical assembly.

As shown in FIG. 1, the optical assembly is assumed to be enclosed in an enclosure 11. In the transmit mode light is reflected from an input copy at a scan station 12 in a scan station module 14 and is directed through a window W1 in enclosure 11 to mirror M1 of the optical assembly. Therefrom the light is directed to a mirror M2 of a galvanometer (galvo) 15. The light from the galvo mirror is reflected to a dichroic mirror M3 (FIG. 2), which is designed to transmit most of the light reflected from the scan station. The light transmitted through the dichroic mirror M3 passes through a lens $L_P$ to a mirror M4. Therefrom it is directed through an aperture A to a photomultiplier (PM) 16. The light from mirror M1 and the various optical elements to the photomultiplier 16 is in the same plane, which is designated in FIGS. 1 and 3 by numeral 17 and is represented by the plane of FIG. 2.

In the receive mode light from a laser 20 (FIG. 2) is directed to a laser lens assembly 21 by a mirror M5, which also transmits a small portion of the laser light to a light sensitive device 20*a*. Lens assembly 21 includes a negative laser lens $L_{L1}$ and a positive laser lens $L_{L2}$. The light output from the latter is a converging circular beam of light designed to focus to a desired spot size at the point where the output paper is to be exposed. The light from lens $L_{L2}$ is directed to the dichroic mirror M3, which is designed to reflect the laser light to the galvo mirror M2.

Figure 3:
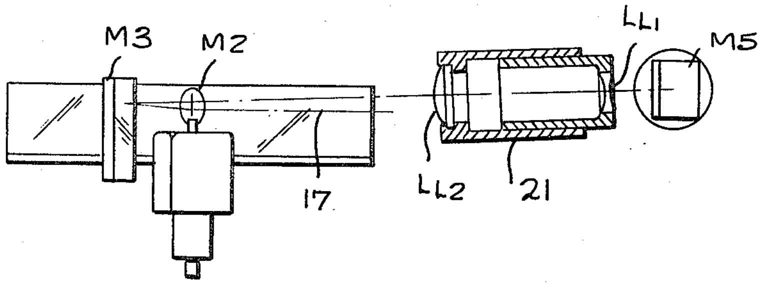

As shown in FIG. 3, the light from the laser 20 is directed at an angle of several degrees, i.e., 2° above plane 17. Consequently, the laser light reflected by the galvo mirror M2 strikes mirror M1 in a direction which is 2° below the plane, as shown in FIG. 1. The laser light is reflected from mirror M1 to a mirror M6 and therefrom through window W2 of the enclosure 11 to a print station 22 of a print station module 24.

As will be explained hereafter in detail, thereat light sensitive paper passes the print station 22 to thereby expose the paper to the laser light which is reflected thereto. The laser light is modulated by video, received from a transmitter unit at another location. After being exposed and developed the light sensitive paper provides an output copy which is a facsimile of the input copy from which the video was derived in the transmitter unit at the other location.

As seen from FIG. 1 the scan station module 14 includes a paper switch 25 which is activated when sensing the leading edge of an input copy 26 inserted into the scan station module through an opening 27 between guides 28 and 29. The activation of switch 25 switches the transceiver from a standby receive mode to a transmit mode. In this mode an input copy drive motor is activated and by means of rollers 30 and 31 puls pulls input copy past the scan station 12. The module 14 also includes a lamp 32 and a special purpose mirror 33, both of which are shielded from mirror M1 by a shield 34 which defines a slot 35, aligned with scan station 12. Thus, as the input copy is pulled by rollers 30 and 31 past the scan station 12, successive strips of the input copy are exposed in the slot 35 and light from lamp 32, which is reflected from the input copy strips, passes through the slot 35 to mirror M1. The function of mirror 33 is to increase the effective light which illuminates the input copy strips at the scan station 12 by producing a virtual image of lamp 32.

The scan station module 14 also includes a pair of rollers 36 nd 37 which are activated by an input copy pullout motor to pull the input copy out of the scan station module, after it has been fully exposed at the scan station. If desired, a single motor may be used to drive both rollers 30 and 31 and rollers 36 and 37.

Figure 4:
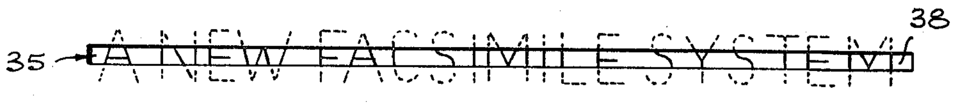
FIG. 4 is a front view of a slot in a scan station module.

FIG. 4 is a simple front view of the slot 35 showing an exposed illuminated strip 38 of input copy 26 with portions of characters thereon. In FIG. 4 the character portions which are exposed in the slot are shown by solid lines and the blocked off portions of the various characters by dotted lines. In practice, the slot length is equal to the copy width in order to expose any characters which may be printed up to the copy edge. Light from each incremental area of the copy strip from one end of the copy to the other is reflected to the photomultiplier 16 by means of the galvanometer 15 and the rest of the elements previously described of the optical assembly.

As is appreciated by those familiar with the art, a galvanometer is an electromagneto mechanical device whose mirror rotates about a fixed axis of rotation as a function of the amplitude of the input signal applied to the galvanometer. In the present invention, the amplitude of the galvanometer's input signal is controlled so that the galvanometer mirror M2 scans each exposed input copy strip from one end to the other. This is achieved by varying the galvanometer's signal amplitude so that the galvanometer's mirror rotates linearly from a first position in which light from one end of the copy, example the left end, is reflected to the mirror to a second position in which light from the right end of the copy is reflected to the photomultiplier through the optical assembly. Then, the galvo mirror is returned speedily to the first position, known in the art as fly back, and thereafter is rotated once more toward the second position in order to scan a succeeding strip of the input copy. As each exposed strip is scanned, light is modulated by the character portions thereon and therefore the photomultiplier produces an amplitude modulated signal, often referred to as the video signal or simply video. In the present invention, the video is transmitted by the transceiver to another location for producing a facsimile of the input copy.

The function of lens $L_p$ is only to focus the desired incremental element from the input copy of the scan station 12 at aperture A. In one application, very satisfactory results were achieved with an aperture A in the form of a rectangle 3 mils wide in plane 17 and 5 mils long. With lens $L_p$ providing a magnification factor of 3, the aperture provided a path for light reflected from each incremental area of 9 × 15 mils of the input copy.

In the receive mode, video, received from another location, is used to modulate the laser 20. As previously explained the modulated laser beam is reflected by the optical assembly to the print station 22 to expose the light sensitive paper passing thereby. The exposed paper, rather than being a discrete sheet of paper, is the leading portion of a long roll of light sensitive paper. After exposing it with all the video received from a complete input copy, the paper is severed from the roll and is transferred to a developing unit wherein it is thermally developed to produce the desired facsimile output copy.

In accordance with the present invention, in addition to the video, sync pulses are transmitted to the receiver unit. These are used to synchronize the galvo therein to the galvo mirror rotation in the transmitter unit so that each strip of the light sensitive paper is exposed with laser light modulated by video produced from the scanning of a corresponding strip of the input copy. The manner in which synchronization is achieved will be described hereafter.

From the foregoing decription, it is thus seen that in the present invention a single galvanometer with associated optical elements, such as mirror M1 and dichroic mirror M3 are used in either the transmit mode or the receive mode of operation. The dichroic mirror M3 is actually only needed in the receive mode in order to reflect the light from lens $L_{L2}$ to the mirror M2 (see FIG. 2). In the transmit mode, light merely passes therethrough. Consequently, if desired, dichroic mirror M3 may be replaced by a simple reflective mirror which may be moved out of the light path in the transmit mode and dropped into position in the receiver mode. However, in order to eliminate potential sources of malfunctioning, such as moveable mirrors, it is preferable to employ the dichroic mirror which is fixed in position. It should be pointed out that except for the rotating mirror M2 of galvo 15 all the other optical elements are fixed in position thereby forming an optical assembly which insures maximum reliability.

Figure 5:
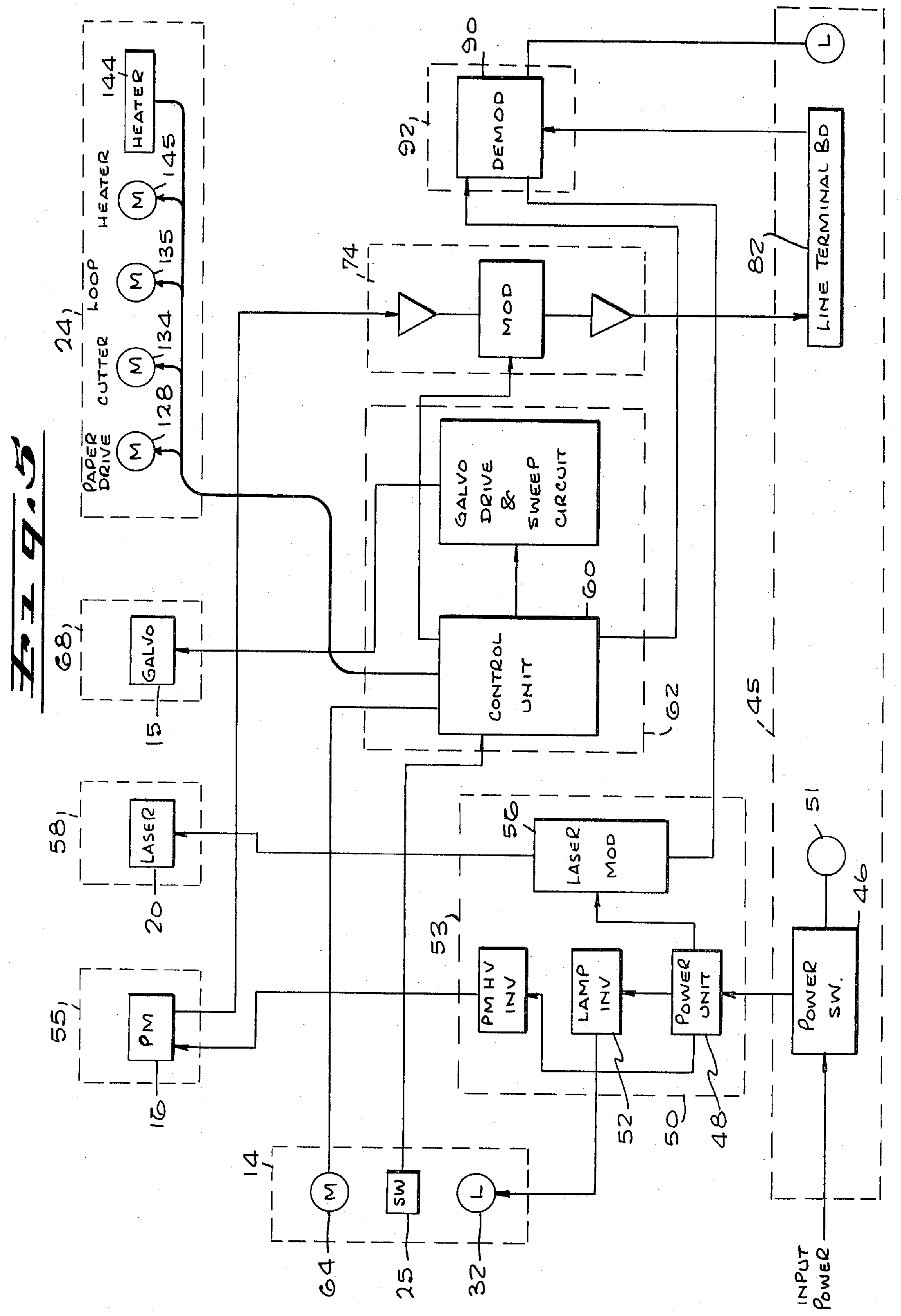
FIG. 5 is a basic modular block diagram.

Attention is now directed to FIG. 5 which is a modular block diagram of the transceiver. This figure will be used to describe the transmit and receive modes of operation in accordance with the present invention. The transceiver in addition to the scan station module 14 and the print station module 24 includes an input-output module 45, which incorporates a power switch 46, used to control the supply of input power from an appropriate source, such as 110 volts 60 cycle to a power unit 48 of a power module 50. Whenever the transceiver is powered a lamp 51 in module 45 is illuminated.

Briefly, the function of the power unit 48 is to supply power to the various circuits of the transceiver. As shown in FIG. 5 the power module 50 is shown incorporating a lamp inverter 52 which provides high frequency voltage signals to lamp 32 in the scan station module 14, the lamp being assumed to be a high frequency fluorescent lamp. The power module 50 is also shown including a photomultiplier high voltage (PMHV) inverter 53 which powers the photomultiplier 16 in a PM module 55. Furthermore, the power module 50 is shown including a laser modulator 56 which modulates the light beam of laser 20 in a laser module 58, in accordance with the video received from a transmitting location.

As previously pointed out, the transceiver is assumed to be in the standby receive mode except when it is switched to the transmit mode. This occurs when the leading edge of an input copy is sensed and activates the copy switch 25 in the scan station 14, which as shown in FIG. 5 is connected by means of line 59 to a control unit 60 of a basic electronic module 62. The control unit 60 includes an interlock circuit which inhibits the transceiver from being in the receive mode and holds it in the transmit mode as long as switch 25 is activated by the input copy sensed thereby.

During the transmit mode the control unit 60 provides activating signals to a motor 64 in the scan station 14. The motor 64 is coupled to the rollers 30 and 31 and is further assumed to be coupled to rollers 56 and 37. Thus, when energized it pulls the input copy passed the scan station 12 at a uniform preselected rate and out of module 14. In addition, the control unit 60 supplies synchronizing pulses to a galvo drive and sweep circuit 66 which provides the input signal to galvo 15 of a galvo module 68. The sweep circuit controls the galvo mirror M2 to scan successive strips of the input copy as they are exposed at the scan station 12.

The video from the photomultiplier 16, after being amplified by an amplifier 72 of a transmitter module 74 and synchronizing pulses from the control unit 60 are supplied to a modulator 76 of module 74. The latter is designed to modulate carrier signals of a frequency controlled by control unit 60 with the synchronizing pulses or with the synchronizing pulses and the video as will be described hereafter. The modulated carrier signals hereafter also referred to as the carrier are amplified by a line amplifier 78 and supplied to a line terminal board 82 of input-output module 45. Board 82 serves as the input-output board between the transceiver and the communication equipment, such as telephone lines, used to transmit the carrier to another receiver unit or receive a modulated carrier from another transmitter unit.

When the trailing edge of the input copy is sensed by switch 25 the transceiver remains in the transmit mode for a selected period during which motor 64 continues to rotate the various rollers in order to pull the entire input copy passed the scan station 12, and thereafter pull the entire copy that the input copy is completely pulled out of the scan station module 14. Also, during a portion of this period the modulator 76 is controlled by the control unit 60 to continue supplying a carrier of a selected frequency for transmission to the receiver unit at a receiving location for purposes to be described hereafter. Thereafter, the transmit mode comes to an end and the transceiver automatically returns to the standby receive mode.

In the receive mode as soon as a carrier of a selected frequency is received, by a demodulator 90 of a receiver module 92 through the line terminal board 82, the control unit 60 locks the transceiver in the receive mode. During this mode the detected video is supplied from the demodulator to the laser modulator 56 in order to modulate the laser beam in accordance therewith. Also, the detected synchronizing pulses are supplied to the control unit 60 to control the sweep of the galvanometer 15 by means of sweep circuit 66 so that the video from each strip of the input copy which modulates the laser beam is reflected by the galvanometer mirror M2 to expose a corresponding strip of the paper passing past the print station 22. The input-output board module 45 may also include a lamp 94 which is illuminated whenever the transceiver is in the receive mode.

The operation of the system described so far may best be explained in connection with a specific example, presented for explanatory purposes only, rather than to limit the invention thereto. Therein AM modulation is assumed. Upon sensing the leading edge of an input copy, control unit 60 controls the modulator 90 to produce a carrier frequency of 2750 Hz for a preselected period of time, i.e., 3 seconds. The unit 60 also produces synchronizing (sync) pulses at a rate of 6 Hz, each pulse having a selected duration, e.g., 5 milliseconds (ms). A sequence of such pulses is diagrammed in line a of FIG. 6 to which reference is made herein. Therein the pulses in line a are designated by numeral 100. These pulses are supplied to the modulator 76 for transmission to an appropriate receiver unit wherein the pulses received during the first 3 seconds on the carrier frequency of 2750 Hz are used for galvanometer synchronization, as will be explained hereafter.

In the transceiver which now operates as a transmitter unit, the sync pulses are supplied to the galvo driver and sweep circuit 66 wherein the leading edge of each sync pulse 100 activates the sweep circuit to produce a corresponding pulse 101 of a selectable duration. For explanatory purposes each pulse 101 is assumed to be of a duration of 5 ms which equals the duration of its corresponding sync pulse 100. A sequence of pulses 101 is diagrammed in line *b*, FIG. 6.

Briefly, the sweep circuit 60 produces an output voltage having a waveform, as shown in line *c*, which is applied to the galvanometer 15. Between pulses 101 the voltage increases linearly from a first value designated V1 to a value V2 as represented by lines 105. As a result, the galvo mirror M2 is linearly rotated from a first position in which the mirror is assumed to reflect light from the extreme left end of the input copy to PM 16, to a second portion in which the galvo mirror reflects ight for the right end of the copy. During the duration of each pulse 101, which herebefore has been indicated as being 5 milliseconds long, the voltage applied to the galvo is reduced from V2 to V1 in essentially a critically damped manner, so that at the end of each pulse 101 the voltage applied to the galvo is V1, thereby insuring that the galvo mirror is at the first position and is ready to again be rotated towards the second position to scan a succeeding strip of the copy. Thus, it is apparent to those familiar with the art, that between pulses 101 the galvo mirror scans the input copy and during each pulse 101 it flies back to its original position to be ready to scan a succeeding copy strip. By controlling the voltage change during each pulse 101 in the sweep circuit the galvo mirror is accurately returned to the first position for proper scanning of the succeeding copy strip.

In the present example, it is assumed that the input copy moves in the scan station module from switch 25 to the scan station 12 for at least 3 seconds before any characters are exposed thereat. After three seconds, the control unit 60 supplies a control signal to modulator 76 causing it to provide a carrier frequency of 2400 Hz. Any character portions which are scanned by the galvo 15 modulate the light and as a result the output signal from the photomultiplier tube 16 is modulated, representing the desired video. As seen from FIG. 5 the video is amplified in amplifier 72 and supplied to modulator 76 for subsequent amplification by line amplifier 78 and transmission via board 82 to an appropriate receiver unit. During the scanning of the input copy, in addition to the video, the sync pulses 100 are also supplied to the modulator 76 wherein they modulate the carrier frequency of 2400 Hz for transmission purposes. The use which is made of these sync pulses in the receiver unit will be described hereafter in connection with the description of the received mode of operation.

The modulator 76 continues to supply the carrier frequency of 2400 Hz which is modulated by the sync pulses and the video, until the trailing edge of the copy is sensed by the paper switch 25 which is deactivated by the copy trailing edge. Three seconds after, the paper switch is deactivated, the control unit 60 supplies a control signal to the modulator to switch the carrier frequency from 2400 Hz to 2750 Hz, the reception of which in the receiver unit is indicative of the end of the transmitted copy. In the particular example following the deactivation of switch 25 the modulator is kept turned on for several seconds, e.g., 5. In addition, the control unit 60 continues to activate motor 64 to insure that the active input copy is passed through the scan station module 14. After such period the motor is deactivated and the transceiver returns to the standby receive mode.

From the foregoing, it is thus seen that in accordance with the present invention during the complete transmit cycle sync pulses are produced at a fixed rate, e.g., 6 Hz, with each pulse being of a selected duration, e.g., 5 milliseconds. These pulses are continuously transmitted to another receiver unit. During the first three seconds only the sync pulses are transmitted on a carrier frequency of 2750 Hz. After the 3 seconds, the carrier frequency is switched to 2400 Hz and both sync pulses and video are transmitted to the receiver unit. When the trailing edge of the copy is sensed, the modulator remains active for 5 seconds, during which the carrier frequency is switched to 2750 Hz. In addition, the motors in the scan station, remain energized for a period of 16 seconds to pull the entire input copy out of the scan station module.

Figure 7:
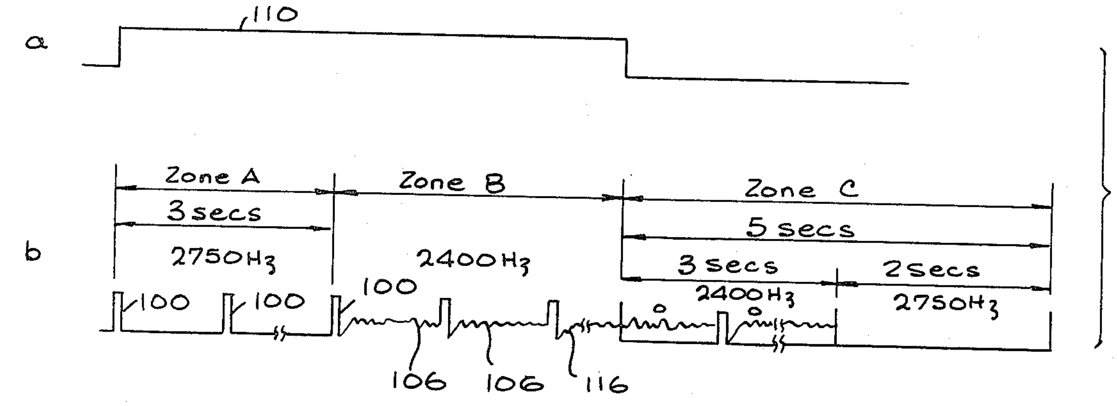

The transmit mode of operation may also be summarized in connection with FIG. 7 in which in line a, the leading edge of a pulse 110 represents the instant when the leading edge of the input copy is sensed by paper switch 25. The trailing edge of pulse 110 represents the instant when the trailing edge of the input copy is sensed by the switch 25 which is deactivated. During the first three seconds after this switch is activated, designated in line *b* as Zone A, only the sync pulses are transmitted by a carrier of 2750 Hz. After the three seconds, sync pulses 100 and video, represented by numeral 106, are transmitted via a carrier of 2400 Hz, during the portion of the transmit cycle defined as Zone B. Zone B ends when the trailing edge of pulse 110 is produced, i.e., when paper switch 25 is deactivated. However, the transmit cycle continues through a Zone C. During the first three seconds of Zone C the modulator is kept turned ON and a carrier frequency of 2400 Hz is transmitted with video. It is assumed that at the end of these three seconds, the trailing edge of the input copy has reached the scan station 12. After the first three seconds, the carrier frequency is changed to 2750 Hz for several seconds, e.g., 2 seconds to produce a cut signal in the receiver. Thereafter the modulator is turned OFF. Thus, in this example Zone C is 5 seconds long. During the entire period of Zone C, motor 64 in the scan station module remains activated to insure that the input copy is completely pulled out of the scan station module. In the transceiver, once the transmit cycle is completed the unit automatically returns to a standby receive mode in which it is capable of receiving signals from any transmitter unit to which it is connected by means of board 82.

Before proceeding to describe the receive mode of operation, attention is again directed to FIGS. 1 and 5 in connection with which the print station module 24 will be described. Module 24 includes a paper cassette 120 (FIG. 1) which contains a long roll of light exposable and thermally developable paper. The leading edge of the paper extends to the print station 22 through a paper tension roller 122 idler 124 and rollers 125 and 126, which are driven by a paper drive motor 128 (FIG. 5). Positioned adjacent the print station 22 is a cutting blade 130 and a rotatable cutter 132 which together form a cutting mechanism 133, the function of which will be described hereafter in detail. Cutter 132 is rotatable by a cutter motor 134. The module 24 further includes a loop motor 135, which by means of rollers 136 and 137 drives paper passing between the rollers toward a paper sensor 140. Positioned beyond sensors 140 is a paper developing unit 142, whice includes a heater 144 and a heater drive motor 145. The function of the latter is to advance paper past the heater at a uniform fixed rate in order to precisely develop the light exposed paper passing thereby.

In operation, the paper from the cassette 120 extends only up to the cutting mechanism 133, formed by blade 130 and cutter 132. When signals are received by the transceiver in the standby receiver mode during the first three seconds, the carrier frequency of 2750 Hz modulated by only sync pulses is received. The demodulator 90 extracts the sync pulses and supplies them to the control unit 60. The latter is reset by the sync pulses and is activated to generate its own local sequence of sync pulses in a manner identical with that performed in the transmit mode. These locally generated sync pulses are used to activate the sweep circuit 62 to control the rotation of mirror M2 of galvo 15, so that after the three second period when video is received on the carrier frequency of 2400 Hz the galvo mirror is in proper position to rotate between its two positions and therefore properly expose the light sensitive paper with the laser beam which is modulated by the received video. Also, the sync pulses which are received after the first three seconds are used as laser beam control. In practice, they are used to blank the beam during galvo fly back.

The receive mode starts as soon as the carrier frequency of 2750 Hz is received. The control unit 60 activates the heater 144 and the heater motor 145 in order to establish in the developing unit 142 the necessary condition for proper development of the paper which is to pass therethrough. However, paper does not extend beyond the cutting station 133 until the carrier frequency of 2400 Hz is received. When this carrier is received the control unit 60 activates the paper drive motor 128 which advances, by means of rollers 125 and 126, the leading portion of the paper roll past the cutting station and through the rotatable cutter 132 toward guides 200. At the same time the loop motor 135 is activated so that by means of rollers 136 and 137 it advances the paper towards the paper sensor 140.

As soon as the leading edge of the paper is sensed by sensor 140, the loop motor 135 is deactivated. However, as long as the carrier frequency is that of 2400 Hz paper is fed towards the rollers 136 and 137. Since the paper cannot advance beyond these rollers, the paper forms a loop which extends into the space between the edge of the upper guide 200 and a cutter station shield 151. In FIG. 1, the loop is designated by dashed lines 152. It should be apparent that while the carrier frequency is 2400 Hz video is received and therefore the paper which passes by the print station 22 is exposed by the modulated laser beam.

This state of operation continues as long as video is received on the 2400 Hz carrier. Then, when the carrier frequency changes to 2750 Hz, as herebefore explained in connection with the transmit mode of operation, the change in carrier frequency causes the control unit 60 to provide an activating signal to cutter motor 134. The latter rotates the cutter 132 in a counterclockwise direction as shown in FIG. 1, so that together with the blade 130 the paper which passed the cutting station 133 and which has been exposed by the modulated laser beam is cut by a scissor-like action, produced by the blade 130 and the rotatable cutter 132. Also, as soon as the carrier frequency is no longer 2400 Hz the paper drive motor 128 is deactivated. Consequently, the leading edge of the paper roll extends only to the cutting assembly 133.

The loop motor 135 is also activated when the carrier frequency changes from 2400 Hz to 2750 Hz. Consequently, it advances the light exposed paper to the developing unit 142. Therein by means of the heater motor 145, the light exposed paper is passed by the heater 144 at a constant rate to insure proper thermal development of the light exposed paper which exits the developing unit 142, as shown by arrow 155, in FIG. 1, into a well 156. The thermally developed paper is now a facsimile output copy of the original input copy in the transmitter unit. To insure proper development the heater 144 and the heater motor 145 are turned on as soon as the first carrier signals of 2750 Hz are received to condition the developing unit for proper development. These elements remain turned on for a sufficient period, e.g., 16 seconds after the reception of the last received 2750 Hz signals.

In operation, the paper is advanced through the paper station module 24 at the same rate that the input copy is advanced through the scan station module 14. Consequently, it should be apparent to those familiar with the art that since in the present invention, paper advances in the print station module 24 only while the carrier frequency of 2400 Hz is received, which is directly related to the time period during which paper switch 25 senses the leading and trailing edges of the input copy, the length of the output copy produced in the print station module 24, is substantially equal to the length of the input copy. Furthermore, the output copy does not include a useless leader portion which, in the prior art is generally severed from the output copy. It should further be apparent, that except for reloading of the cassette 120 the receiver unit of the transceiver requires no operator attendance. It automatically turns on whenever signals are received from another location and it is automatically turned off after a facsimile copy has been produced.

In the transmit mode, operator attendance is required if the input copies are entered manually into the scan station module 14. However, if desired, an automatic copy feed attachment, designated in FIG. 1, by numeral 160, may be attached to the scan station module 14. The automatic feed attachment may be controlled by the control unit 60 to automatically feed copies to be transmitted one at a time. For example, the trailing edge of 110, which occurs when the paper switch 25 is deactivated by the trailing edge of one copy passing through the scan station module 14 may be used to activate the automatic copy feed attachment 160 after an appropriate delay to automatically insert another input copy into the scan station module 14 for subsequent transmission.

Attention is again directed to the modular block diagram of FIG. 5. All the modules shown therein are required in a transceiver to provide it with both transmit and receive mode capabilities. However, if only one of the modes is required, several of the modules may be eliminated, depending on which is the desired mode. For example, the transceiver may be converted into a transmitter unit by eliminating those modules needed for the receive mode of operation. These include the print station module 24, the laser module 58, and the receiver module 92. On the other hand, the transceiver may be converted into a receiver unit by eliminating those modules needed for the transmit mode operation. These modules include the scan station module 14, the photomultiplier module 55 and the transmitter module 74.

It should be pointed out, that several of the modules are common to both modes of operations. These include the galvo module 68 which includes the galvanometer 15 and the rest of the optical assembly, as hereinbefore described, the input-output module 45, the power module 50 and the basic electronic module 62. The latter incorporates the control unit 60 and the galvo drive and sweep circuit 66, which are needed for either the transmit or the receive mode of operation. It should be stressed that any unit can be converted to have the capabilities of performing in either or both modes of operation, by merely inserting or removing the appropriate modules. All modules are of the pluggable type to facilitate their insertion or removal as the case may be.

Before proceeding to describe a simplified embodiment of the control unit 60, a summary of the functions performed by this unit during either the transmit or receive mode is believed to be in order. In the transmit mode, which starts when switch 25 is activated by sensing the leading edge of an input copy, the control unit locks the transceiver in the transmit mode. It lasts until the switch 25 is deactivated by the trailing edge of the input copy and for a short period, e.g., 5 seconds thereafter. During the transmit mode, the control unit provides the sync pulses 100 (see FIG. 6, line *a*) to the modulator 76 and to the sweep circuit 66. Also, during the first three seconds of the transmit mode the control unit 60 controls the modulator to provide the carrier frequency of 2750 Hz. Thereafter, the modulator provides the carrier frequency of 2400 Hz until the end of 3 seconds following the trailing edge of the input copy which is sensed by switch 25. Thereafter control unit 60 controls the modulator to again provide the carrier frequency of 2750 Hz for a period of 2 seconds.

In the receive mode, as soon as a carrier frequency of 2750 Hz is received the control unit 60 locks the transceiver in the receive mode. In this mode, the control unit provides the sync pulses in a manner similar to that provided during the transmit mode. The sync pulses detected during the first three seconds on the carrier frequency of 2750 Hz are supplied to the control unit 60 to synchronize the locally generated sync pulses with those which are being received.

Figure 8:
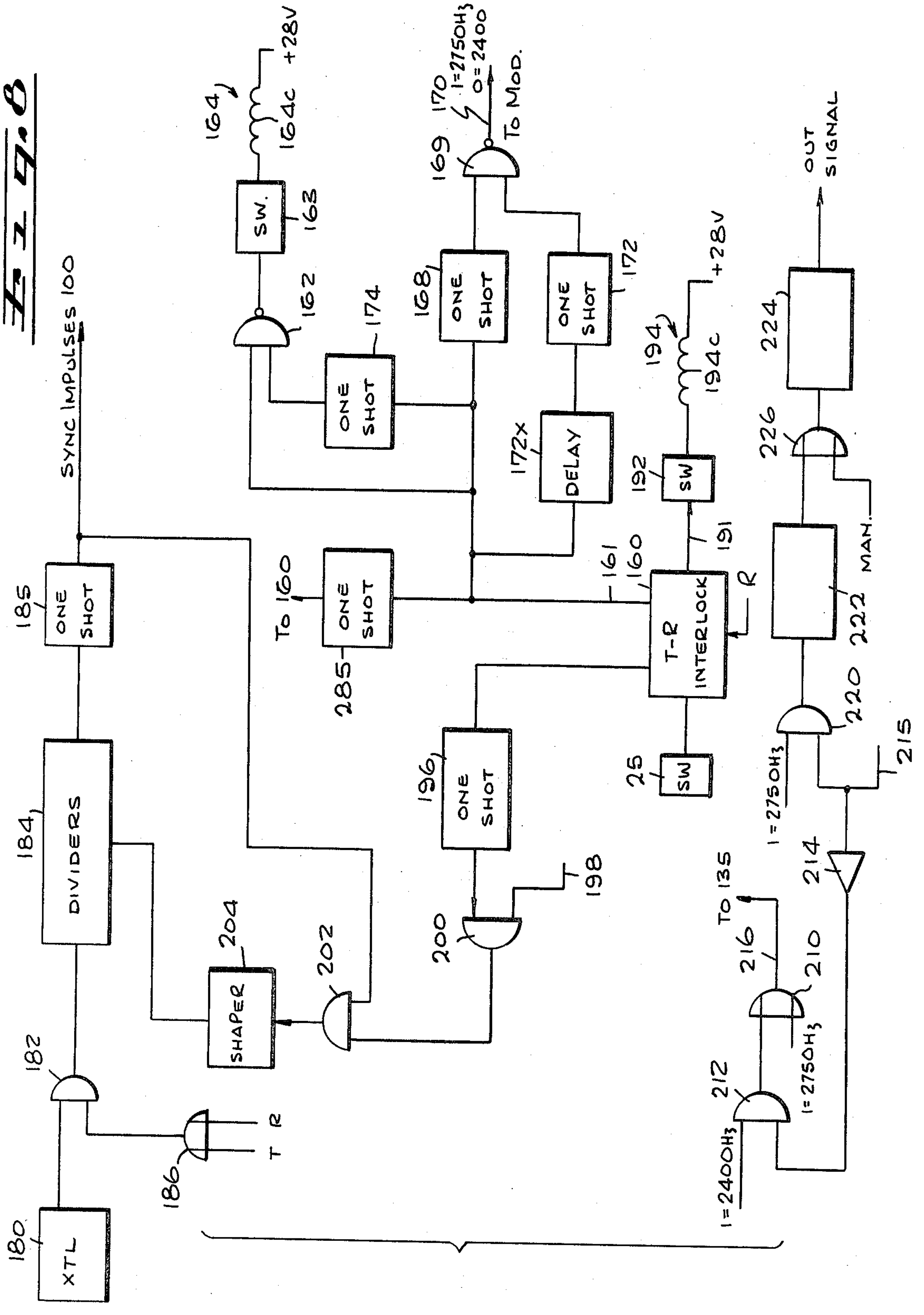
FIG. 8 is a block diagram of a basic control unit.

Attention is now directed to FIG. 8 which is a simplified block diagram of the control unit 60. The various elements, shown therein, are merely used to further explain the functions of the control unit 60 rather than to limit the invention thereto. Briefly, the control unit 60 includes a transmit receive (T-R) interlock 160. When the transceiver is in the standby receive mode and switch 25 is activated the interlock 160 locks the control unit 60 into the transmit mode. In this mode output line 161 is at a preselected level, hereafter referred to as a binary zero or simply zero. As a result, NAND gate 162 provides a binary one output, which enables switch 163, which in turn energizes the coil 164*c* of a transmitter hold relay 164. As long as relay 164 is on, power is supplied to the motor 64 in the scan station module 14 to thereby pull the input copy past the scan station 12 and by means of rollers 36 and 37 pull the copy out of the scan station module. The control unit 60 also includes a three second one-shot 168 which is enabled as soon as output line 161 is a binary zero. The one-shot provides a zero output for three seconds during which gate 169 is enabled to provide a one output on line 170. Line 170 is connected to the modulator 76, and whenever line 170 is a binary one, the modulator provides a carrier frequency of 2750 Hz, while providing the carrier frequency of 2400 Hz whenever line 170 is a binary zero. Consequently, during the first three seconds of the transmit mode the modulator provides the carrier frequency of 2750 Hz. At the end of the three seconds, the output of one-shot 168 becomes a binary one and therefore a binary zero is impressed on output line 170.

This condition exists as long as the switch 25 is enabled. Upon sensing the trailing edge of the input copy and becoming deactivated, a binary one is impressed on line 161. When this happens a two second one-shot 172 is activated through a three second delay 172*x* to provide a binary zero to gate 169 which therefore provides a binary one output line 170. Consequently, the modulator carrier frequency is switched again from 2400 to 2750 Hz for 2 seconds. It should be pointed out that this occurs three seconds after the deactivation of switch 25. This is necessary to enable the trailing edge of the copy to reach the scan station 12.

Also, when line 161 switches from a binary zero to a binary one, a five second one-shot 174 is activated to provide a binary zero input to NAND gate 162. Consequently, switch 163 remains enabled for an additional five seconds and therefore the transmitter hold relay 164 remains on for five seconds, thereby enabling the motor 64, which drives the various rollers in the scan station module 14, to pull the entire input copy out of the scan station module.

As seen in FIG. 8, the control unit 64 includes a crystal 180 connected through a gate 182 to a chain of dividers 184 and a one-shot 185. Gate 182 is enabled only when the control unit 60 is in either the transmit mode or in the receive mode. An OR gate 186 whose output is connected to gate 182 is also included. Whenever the system is in the transmit mode, represented by the letter T, or by the receive mode, represented by the letter R, gate 186 is enabled to in turn enable 182 to permit the high frequency pulses from the crystal 180 to be supplied to the divider chain 184. Therein the frequency is divided in order to produce a square wave form at a frequency of 6 Hz. This square wave is shaped by the one-shot 185 to provide the sync pulses 100, shown in line *a* of FIG. 5. As previously explained, the sync pulses are supplied to the sweep circuit 66 as well as to the modulator for transmission to a receiver unit. It is thus seen, that the control unit 60 provided during the transmit mode the sync pulses, it holds the transmitter hold relay 164 in the ON state, and controls the modulator to provide a carrier frequency of 2750 Hz during the first three seconds of the mode, followed by 2400 Hz until three seconds after the trailing edge of the input copy is sensed and thereafter to provide a carrier frequency of 2750 Hz for an additional two second period.

In the standby receive mode whenever a carrier frequency of either 2750 Hz or 2400 Hz is received, and detected by demodulator 90, the interlock 160 locks the transceiver in the receive mode. As previously explained, it is apparent that during the first three seconds of this receive mode the carrier frequency is that of 2750 Hz. As soon as the transceiver is locked in the receive mode, the interlock 160 provides a zero output on line 191 which enables switch 192 to energize coil 194*c* of a receive hold relay 194. The function of the latter is to enable by means of its contacts and other logic circuitry, to be described hereafter, to energize the various motors of the print station module 24. Also, when relay 194 is activated or ON, the heater 144 and the heater motor 145 are energized to precondition the developing unit 142 to establish therein the necessary development condition for developing the output copy which is to pass therethrough.

The control unit 60 also includes a three second one-shot 196 which is activated as soon as the receive mode is initiated. The sync pulses received during the first three seconds are supplied to line 198 from the modulator 90. Thus, during the first three seconds of the receive mode gate 200 provides pulses corresponding to the sync pulses which are received. Its output together with the locally generated sync pulses represented by the output of one-shot 185 are supplied to a gate 202, whose output is connected to a pulse shaper 204. The function of the gate 202 is to provide an output pulse only when the locally generated sync pulses do not coincide in time or synchronize with the received sync pulses. Whenever this occurs the output pulse from gate 202 activates the pulse shaper 204 to provide a pulse of very short time duration which resets the dividers 184. Whenever the latter are reset an output pulse is produced by the one-shot 185. However, if each sync pulse, received during the first 3 seconds of the receive mode from the demodulator 90, is synchronized (in time coincidence) with a sync pulse from one-shot 185, gate 202 is not enabled and therefore no resetting of the dividers takes place. It should thus be appreciated by those familiar with the art that the received sync pulses during the first three seconds of the receive mode are used to synchronize the locally generated sync pulses therewith. If desired, the sync pulses received after the first 3 seconds of the receive mode may likewise be used to synchronize the locally generated sync pulses therewith.

As previously pointed out, in the print station module 24, the paper drive motor 128 is only activated when 2400 Hz is received since this carrier frequency carries the video which is used to modulate the laser beam and to expose the paper at the print station 22. The loop motor 135 is energized whenever the carrier frequency is 2750 Hz or when the carrier frequency is 2400 Hz, until the paper sensor 140 senses the leading edge of the paper causing the sensor to be activated or turned ON.

The control of the loop motor 135 is achieved by means of several logic elements to be described. These include an OR gate 210, a gate 212 and an inverter 214. It is assumed that as long as the sensor 140 is inactive, its output on line 215 is a zero. Consequently, the output of inverter 214 is a one and, therefore, when the carrier frequency of 2400 Hz is received, the two inputs to AND gate 212 are ones and therefore it provides a one output, which activates OR gate 210 to provide a one output on line 216. The one output on this line grounds one terminal of the loop motor 135, the other terminal of which is connected to plus 28 volts through the contacts of hold relay 194. Thus, in the receive mode the loop motor 135 is only activated when a binary one level is present on the line 216. As shown in FIG. 8, the OR gate 210 is also enabled to provide a one output on line 216 whenever the carrier frequency is 2750 Hz. It should be appreciated however, that when the sensor 140 is activated and its output on line 215 is a binary one, since at that time the carrier frequency is 2400 Hz neither input to OR gate 210 enables the gate and, therefore, the binary level on line 216 is a zero. Consequently, loop motor 135 is deactivated.

The output of the sensor 140 is also used to control the operation of the cutter motor 134. As shown in FIG. 8, line 215 is connected to one input of an AND gate 220 which is supplied with a one input on another line whenever the carrier frequency is 2750 Hz. Whenever both inputs to gate 220 are ones, it provides an enabling output 2 to a one-shot 222 which supplies a sufficient delay to enable the light exposed paper to reach the cutting station 133. Thereafter the one-shot 222 activates a second one-shot 224 whose output energizes the cutter motor 134 to rotate the rotatable cutter 132 and thereby together with the blade 130 sever the portion of the paper which was exposed by the laser beam from the rest of the paper roll. The function of one-shot 224 is to provide a sufficient period during which the cutter motor is energized in order to insure that proper paper cutting takes place. Preferably, one-shot 222 is connected to the one shot 224 through an OR gate 226 which is provided with another input in order to manually activate the one-shot 224 for manual cutting purposes.

Figures 9, 9A:
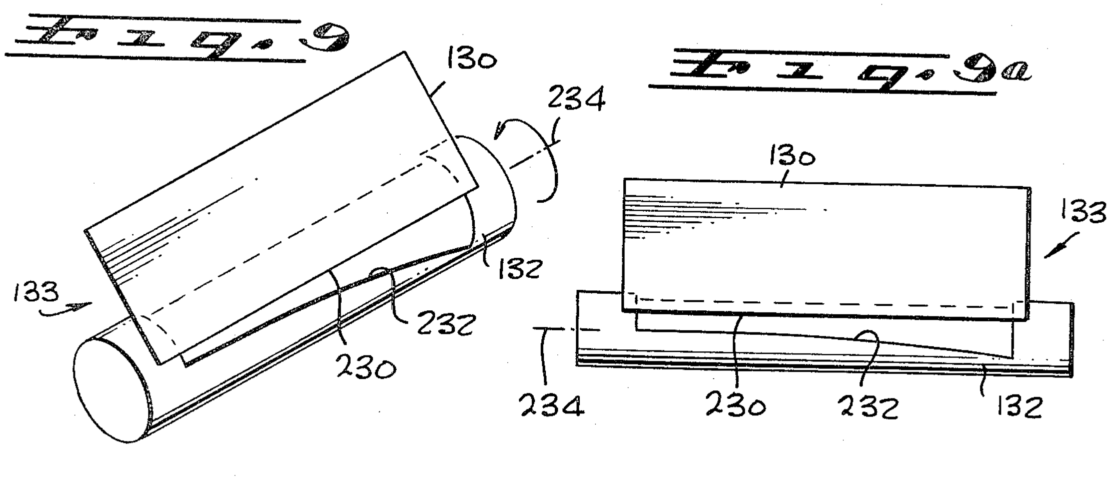
FIGS. 9 and **9*a*** are diagrams useful in explaining a novel cutting station.

Attention is now directed to FIG. 9 in connection with which the novel cutting station 133 will be described. As seen therefrom, the rotatable cutter 132 is in the shape of a cylinder with the edge 230 of blade 130 being spring biased against the outer surface of the cylinder. A cut is formed in the latter to define a surface designated by numerals 232 in FIG. 9*a* which is a front view of the cutting station. In the present invention, the paper extends between the edge 230 and surface 232 toward guides 200 as previously explained in connection with FIG. 1. As seen from FIGS. 9 and 9*a* the front edge of surface 232 rather than being parallel to the axis of rotation of the rotatable cutter 132, the axis being designated with the numeral 234 is helically shaped from one end to the other. Consequently, when the cutter motor 134 is activated and the rotatable cutter 132 rotates, the paper is not cut simultaneously across its entire width, but rather is cut in a scissor-like action from its left end toward the right end thereof. Such a cutting arrangement insures proper paper cutting and prevents any malfunctioning which might have occurred had the paper been severed at once across its entire width. A helix may be of about 20° has been found to produce excellent results.

Figure 10:
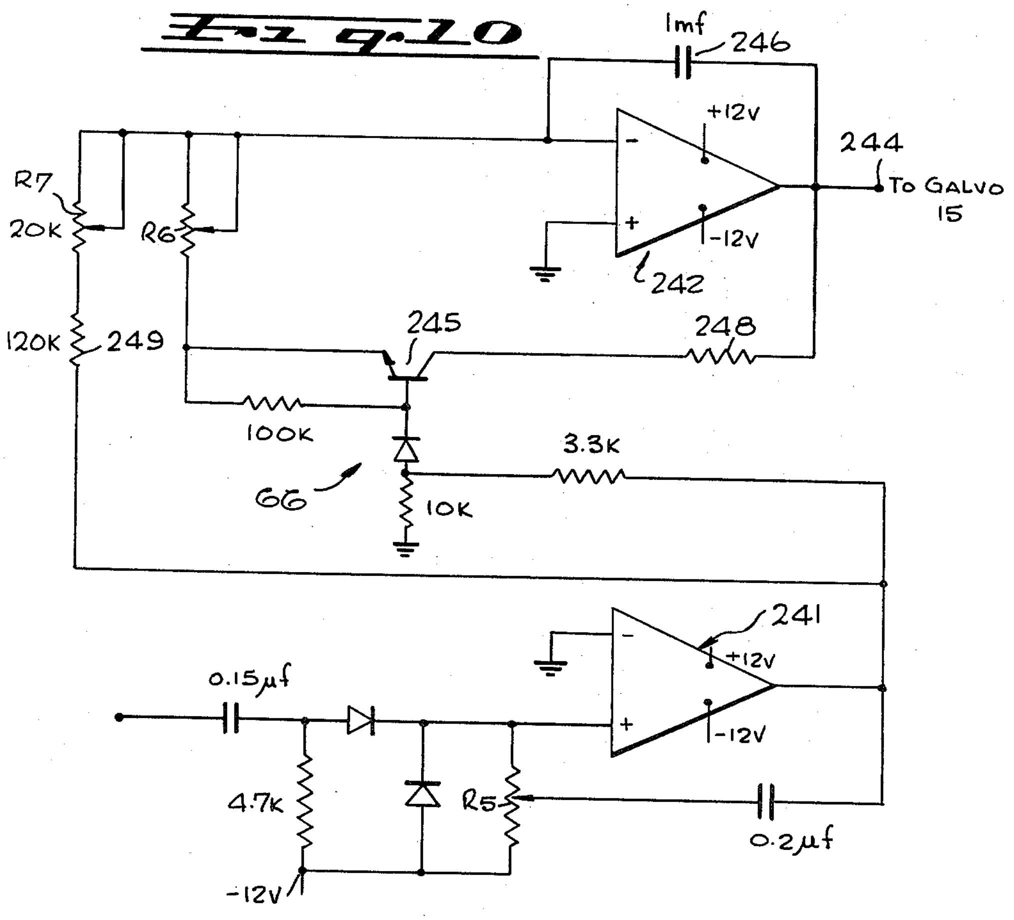
FIGS. 10 and 11 are schematic diagrams of circuits in accordance with the present invention.

Attention is now directed to FIG. 10 which is a schematic diagram of the galvo driver and sweep circuit 66. As previously pointed out, it generates the input voltage to the galvo, as shown in line *c*, FIG. 6. Basically, the driver and sweep circuit consists of a one-shot 241 and an integrator circuit 242, whose output at terminal 244 is the sweep voltage which is applied to the galvo. As previously explained in response to the leading edge of each sync pulse 100 (see FIG. 6, line *a*) the one-shot produces a positive pulse of a duration which is controlled by the setting of R5. In the present example, it is assumed that the duration is the same as that of each sync pulse, i.e., 5 ms. These pulses are diagrammed in line *b*, FIG. 6 and are designated by numeral 101. During the duration of each pulse 101 a transistor 145 is driven into saturation, thus, providing a discharge path for capacitor 246 of the integrator 242 through a fixed resistor 248 and a variable resistor R6. Depending on the particular galvo which is used R6 is adjusted so that the voltage at terminal 244 drops to V1 during the pulse duration without overshoot, thereby rotating the galvo mirror to the first position. Thus, change of the input voltage to the galvo to V1 is effectively the fly back voltage change which returns the galvo mirror to the first position, needed to activate sweep initiation. Then, at the end of each pulse 101, the transistor 245 is cut off and a negative voltage from the one-shot 241 is applied to the integrator 242 through a fixed resistor 249 and a variable resistor R7. The latter is set so that together with resistor 249 and capacitor 246 the output voltage increases linearly from V1 to V2 to form the ramp 105 (see FIG. 6, line *c*) between pulses 101. In the present example, since the sync pulses are supplied at a rate of 6 Hz for a scan rate of 6 lines per second, the ramp duration if (1000/6 − 5) ms. Clearly, the settings of R5 and R6 may be changed to provide any desired fly back voltage change during other than 5 ms, and the setting of R7 may be changed to provide any desired ramp duration for any particular scan rate, other than 6 lines per second.

It is appreciated that for proper operation in the transmit mode the input copy must be illuminated uniformly along its entire width by the lamp 32. For efficiency purposes a fluorescent lamp was found to be most advantageous. However, in a fluorescent lamp the light intensity or illumination is only uniform along its central portion and tends to fall off near the two ends of the lamp. Consequently, a lamp considerably longer than the input copy width is required. To accommodate copies 8.5 inches wide, the lamp needs to be considerably longer than 8.5 inches which is most undesirable since it increases the size of the machine and therefore overall cost. In accordance with the present invention this problem is eliminated by compensating for the reduced illumination at the lamp's ends so that a lamp of a length comparable to that of the input copy width and only somewhat longer can be used.

Briefly, in accordance with the present invention, when the galvanometer mirror scans the input copy near either end there the lamp illumination is lower than that along most of its central portion, the photomultiplier's sensitivity is increased to compensate for the reduced illumination. Thus, the compensation is achieved by increasing the photomultiplier's sensitivity rather than by controlling the lamp's performance. As previously pointed out, in connection with FIG. 6, line *c*, when the galvo mirror is at the first position, i.e., the galvo input voltage is V1, the mirror is positioned to receive light from one end of the copy, e.g., the left end, and when the galvo input voltage is V2 and the mirror is at the second position, it receives light for the other copy end. Thus, points along the ramp voltage shown in FIG. 6 line *c*, correspond to points along the copy width between its ends.

In accordance with the present invention, as the galvanometer starts its sweep by increasing its input voltage from VI toward V2, a peaking triangular-shaped pulse above a constant level is applied to the photomultiplier to increase its sensitivity. The duration and shape of the pulse are chosen so that as the galvo mirror scans the copy near one end where the lamp illumination is low, the pulse increases the photomultiplier's sensitivity to compensate for the lower lamp illumination. As the galvo scans the central portion of the slot where the illumination is uniform, the constant level of input voltage is applied to the photomultiplier. Then as the galvo mirror scans the copy portion near the other end where the lamp illumination falls off, another triangular-shaped pulse is applied to the photomultiplier to increase its sensitivity.

Figure 6:
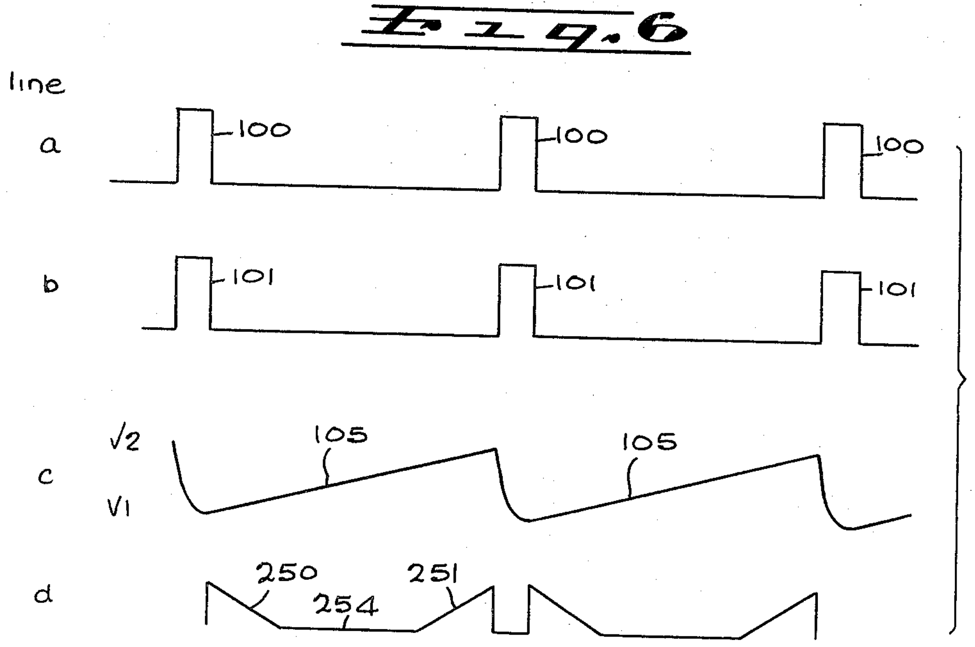
FIGS. 6 and 7 are waveform diagrams useful in explaining the invention.

The two pulses are designated by numerals 250 and 251 in line *d* of FIG. 6. Therein numeral 254 designates the input signal of constant level which is applied to the photomultiplier. The durations and shapes of the pulses are chosen so that as the galvo mirror scans the copy near its ends where the lamp illumination is low, the pulses increase the photomultiplier's sensitivity to compensate for the lower illumination. However, when the galvo scans the central portion of the copy where the illumination is uniform the constant level of input voltage is applied to the photomultiplier.

It is thus seen that in the present invention during each sweep across the copy corresponding to a scan line, during the initial portion of the sweep and during the final portion of the sweep, the photomultiplier's voltage is increased to increase its sensitivity due to reduced lamp illumination. However, during the central portion of the sweep where the lamp illumination is uniform the photomultiplier's sensitivity is held at a constant value by applying thereto an input signal of a constant level.

Figure 11:
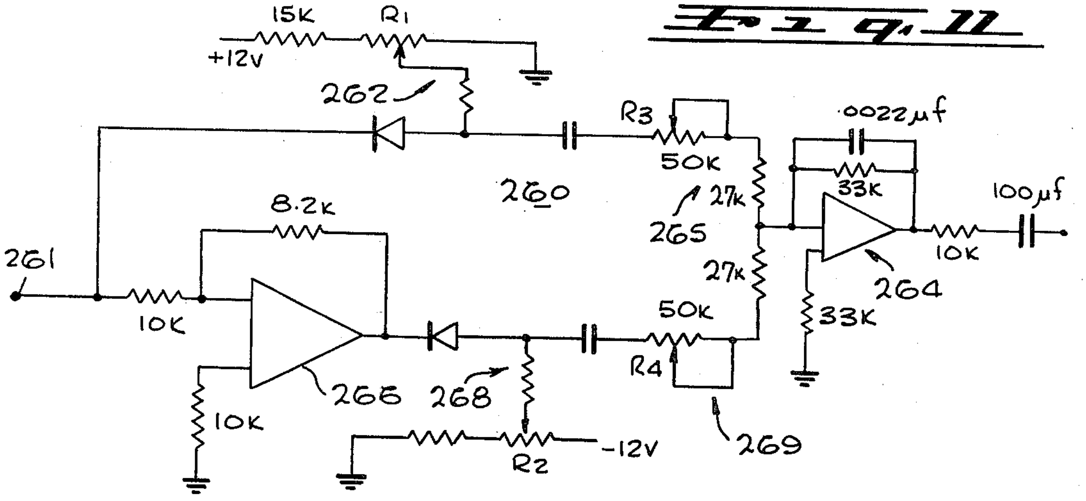

Attention is now directed to FIG. 11, which is a schematic diagram of a circuit 260 used to control the signal level applied to the photomultiplier during each sweep of the galvo mirror. The input signal applied to circuit 260 at input terminal 261 is the ramp voltage which is applied to the galvo and which is designated by numeral 105 in line *c*, FIG. 6. As seen from FIG. 11, the circuit 260 comprises a biased diode threshold sensing circuit 262, which is connected to an output amplifier 264 through a gain control circuit 265. Circuit 260 also includes an inverter 266, another biased diode threshold sensing circuit 268 and another gain control circuit 269. Basically, the setting of variable resistor R1 in circuit 262 controls the pick-off point along the ramp voltage for producing pulse 250 and the setting of R3 in circuit 265 controls the gain of amplifier 264 and therefore the pulse amplitude. Similarly, the setting of R2 in circuit 268 controls the pick-off point with respect to an inverted ramp voltage to produce pulse 251, while the setting of R4 controls the gain and therefore the pulse amplitude.

Thus, the settings of R1–R4 control the pick-off points and the gain to control the locations of the pulses 250 and 251 with respect to the ramp voltage and the amplitudes of these pulses to compensate for reduced illumination near the two ends of the slot. These pulses and their shapes can be adjusted to compensate for the reduced lamp illumination so that in effect the photomultiplier's sensitivity is constant during the entire sweep even though the lamp illumination is not constant across the entire slot.

Circuit 260 may be incorporated in the control unit 60 or in the power module 50 (see FIG. 5). In practice the output of photomultiplier amplifier 72 may be fed back to automatically control the photomultiplier sensitivity as a function of the copy background. Thus, the inverter 53 may be controlled to control the photomultiplier's sensitivity as a function of the copy background and the output of circuit 260.

Figure 12:
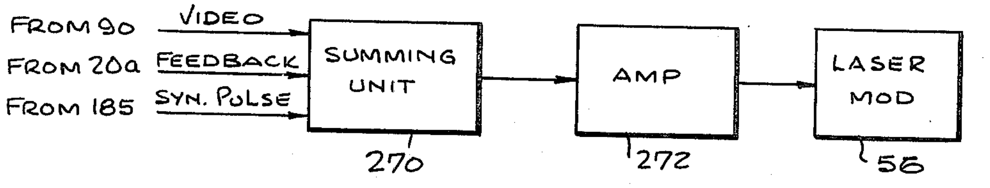
FIG. 12 is a simplified block diagram of circuitry for controlling the laser shown in FIG. 2.

From the foregoing it should thus be appreciated that in the receive mode the paper passing through the print station module 14 is exposed by the modulated laser beam. Clearly it is desired that the paper only be exposed by the beam which is modulated by the video as the galvanometer successively sweeps each strip of the light sensitive paper and not during galvo mirror fly back. In order not to expose the paper to light during galvo mirror fly back the sync pulses generated during the receive mode or the sync pulses received on the carrier of 2400 Hz are used to blank the laser beam during galvo fly back. Also, to provide linearization and stability of the laser beam modulation in the present invention, the output from element 20*a* (see FIG. 2) is fed back for such purpose. As seen from FIG. 12 to which reference is made herein, the video from the demodulator, the feedback signal from element 20*a* and the blanking sync pulses are supplied to a summing unit 270 whose output is supplied to the laser modulator 56 through an amplifier 272. Thus, during each sync pulse when the galvo flies back from the second position to the first position, the laser beam is blanked. Except when blanked the laser provides a modulated light beam in response to the video, which is linearized and stabilized by the feedback signal from element 20*a*, whose output is a function of a portion of the laser beam. The feedback signal from element 20*a* acts as a stabilizing negative feedback in a manner well known in the art.

The manner in which the paper cassette is loaded 120 for operation will now be discussed in connection with FIG. 1. To load the cassette, door 275, which pivots about pivot point 276, and which in operation rests on flanges 277 and 278 is raised. The door 275 actually serves as a floor of well trough 156 into which the output copies exit from the developing unit 142. In addition, a lever is activated to separate the paper drive rollers 125 and 126 from each other so as to form a gap therebetween, as well as to release the paper tension roller 122. Thereafter a new cassette is inserted and the leading edge of the paper roll is extended over idler 125 and pushed downwardly between the substantially vertical guides 281 and 282. The leading edge of the paper roll extends through the rollers 125 and 126 and as the paper is further pushed downwardly it extends through the rotatable cutter 132.

As previously explained, the upper guide 200 pivots above point 201. When the door 275 is raised the upper guide 200 is free to flip downwardly to engage the lower guide 200 as shown in dashed lines in FIG. 1. Consequently, as the paper is pushed downwardly between guides 281 and 282, the leading edge of the paper extends out of cutter 132 and is prevented from extending between guides 200. Rather it exits the print station module between the flanges 277 and 278. The operator takes hold of the leading edge and pulls a few inches of the paper and thereafter closes the door 275 while a portion of the paper extends beyond the closed door. Then a few additional inches of paper are pulled out so as to insure that the paper extending from the cassette 120 up to the print station 22 has not been exposed to light during the cassette reloading. Thereafter, the operator manually activates the rotatable cutter 132 to sever the portion of the unexposed paper from the portion which may have been exposed to light and pulls the exposed paper portion out of the scan station module. Then the lever, previously mentioned, is reactivated to re-engage the paper drive rollers 125 and 126 and the paper tension roller 122. It should be pointed out that when the door is closed the upper guide 200 was previously flipped onto the lower guide 200 to prevent paper from extending therebetween during loading, returns to its upward position as shown in FIG. 1 in solid lines. Thus, the print station module is ready for subsequent operation.

It is apparent, that in order for the output copy to be a facsimile of the input copy, the paper in the print station module 24 must be moved past the print station 22 at the same rate or speed of movement of the input copy past the scan station 12 in the scan station module 14. In order to provide maximum system flexibility, it is desirable to be able to vary the speed of these motors for different operation speeds. To this end, either DC or AC variable speed motors may be employed. Also, if desired, reversible AC motors together with two speed transmission arrangements may be employed in order to provide a first paper speed when the motor rotates in one direction and another paper speed when the motor rotates in the opposite direction. !

From the foregoing description, it should thus be apparent that the receiver unit of the transceiver, except for cassette reloading, requires no operator attendance since all operations therein are performed automatically during the reception of signals from another transmitter unit. It should further be pointed out, that since the paper moves in the print station module 24 only while video is being received on a carrier of 2400 Hz the length of the facsimile output copy is essentially equal to that of the input copy, which can be of any reasonable length depending upon the particular copy inserted into the scan station module. It should also be stressed, that since in the present invention, the output copy is developed in the developing unit 142 only after the video from a complete copy was received, the output copy is developed at a constant rate to produce optimum results.

As previously pointed out, by attaching the automatic input copy feed arrangement 160, to the scan station module 14 the need for operator attendance at the scan station module may be eliminated. In accordance with the present invention, the feed mechanism 160 may be activiated to introduce a subsequent input copy into the scan station module, after a preselected period following the sensing of the trailing edge of a previous input copy by the paper switch 25. This may easily be implemented by adding a one-shot 285 in the control unit 60. This one-shot is activated when line 161 changes from a binary zero to a binary one level which occurs when the trailing edge of an input copy deactivates switch 25. The one-shot 285 provides the necessary control signal for the mechanism 160 after a preselected period following deactivation of switch 25. Such delay is necessary to insure that a new input copy is inserted into the scan station module 14 only after a previous copy has exited therefrom or at least past the scan station 12. Thus, by incorporating the automatic feed arrangement 160, the need for operative attendance at the transmitter unit may also be eliminated.

Herebefore it was assumed that at any time the transceiver operates in either the transmit mode or the receive mode. This is the case in normal operation. However, for testing or system check out purposes, the transceiver of the present invention may be operated in both modes simultaneously. This is possible in the present invention since, as previously explained, the laser beam is directed at an angle with respect to plane 17. Thus, the modulated laser beam may be directed to the print station 25 by the optical assembly which at the same time directs the light reflected from the scan station to the photomultiplier. Such an arrangement is most advantageous since it enables the entire transceiver to be checked out at the same time without having to transmit video to another location to check out the transmitter unit of the transceiver or to receive signals from another location to check out the receiver unit of the transceiver.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a facsimile system, a transmitter unit of the type designed to convert information on an input copy into video for transmission to another location whereat a facsimile of said input copy is produced, the transmitter unit comprising:

input means including means defining a scan station, means for driving an input copy inserted in said input means past said scan station at a uniform preselected rate, so that successive strips of said input copy are exposed thereat, means for illuminating said successive strips and means for sensing the leading and trailing edges of said input copy;

light sensitive means for providing video as a function of light directed thereto;

means for sweeping each illuminated strip and for directing light reflected therefrom to said light sensitive means; and output means for providing carrier signals of a first frequency during a first preselected period following the sensing of the leading edge of said input copy and for modulating carrier signals of a second frequency with said video following said first preselected period until the trailing edge of said input copy is sensed.

2. In a facsimile system as described in claim 1 wherein said output means further provide carrier signals of a third frequency for a second preselected period following the sensing of the trailing edge of said input copy.

3. In a facsimile system as described in claim 1 further including means for providing synchronizing pulses to said output means for modulating the carrier signals of at least one of the first and second frequencies therewith, and for controlling the sweeping of said strips therewith.

4. In a facsimile system as described in claim 3 wherein said means for sweeping include a galvanometer and drive means responsive to each synchronizing pulse for controlling said galvanometer to sweep across each strip during the intervals between successive synchronizing pulses.

5. In a facsimile system as described in claim 4 wherein said first and third frequencies are equal and wherein said output means modulate the carrier signals of said first frequency with said synchronizing pulses and the carrier signals of said second frequency with said synchronizing pulses and said video.

6. In a facsimile system of the type including a transmitter unit at a first station, and a receiver unit at a second station, the transmitter unit including means for converting recorded data into signals which are transmitted to said second station, and the receiver unit including means for converting the received signals into recorded data, the arrangement comprising:

first means located in at least one of said first and second stations including optics means and a single galvanometer means, said optics means being adapted to direct light to said galvanometer means from a first direction in which recording data is adapted to be located, said galvanometer means and said optics means directing said light in a second direction at which light sensitive means are adapted to be located, and said optics means being further adapted to direct light to said galvanometer means from a third direction in which a source of modulated light is adapted to be located, the modulated light representing received data, said galvanometer means and said optics means directing said modulated light to a direction in which a data recording medium is adapted to be located;

a source of synchronizing pulses providing synchronizing pulses at a selected frequency; and sweep control means coupled to said galvanometer means and responsive to said synchronizing pulses for controlling a mirror of said galvanometer means to be at a first position during each synchronizing pulse and for changing the mirror position linearly from said first position to a second position during each interval between synchronizing pulses.

7. In a facsimile system of the type described in claim 6 wherein said optics means includes at least one dichroic mirror for transmitting light to said galvanometer means in the first direction and for reflecting light directed thereto from said galvanometer means to the direction in which said data recording medium is adapted to be located.

8. In a facsimile system the arrangement comprising:

first means including optics means and galvanometer means of the type including a mirror rotatable about a fixed axis of rotation as a function of the amplitude of a signal applied to said galvanometer means and adapted to direct light modulated by recorded data to a direction in which light sensitive means of the type converting light directed thereto into an electrical signal are adapted to be located, said first means being further adapted to direct light of modulated intensity which is directed thereto to a location which a light exposable medium is adapted to be located;

means for providing a succession of pulses of equal durations, the start of each pulse being at a fixed period following the end of a preceding pulse in said succession; and galvanometer control means coupled to said galvanometer means for controlling the amplitude of the signal applied to said galvanometer means to vary substantially linearly from a first level to a second level during each of said fixed periods and for controlling the signal amplitude to vary from said second level to said first level nonlinearly during each pulse duration, whereby the mirror of said galvanometer means rotates at a substantially uniform rate from a first position to a second position during each of said fixed periods and rotates back to said first position during each pulse duration from said second position at a nonuniform rate, so that as said signal amplitude starts to increase linearly from said first level to said second level at the start of each of said fixed periods, the mirror is at said first position.

9. A facsimile system of the type including a transmitter unit wherein data on an original copy is converted into video signals transmittable to a receiver unit wherein the video signals are used to provide a facsimile of said original copy, the system comprising:

a transmitter unit comprising;

input means for receiving an original copy insertable therein and including a switch for sensing the leading and trailing edges of said copy;

means responsive to said switch for establishing a transmit mode period extending between the times said leading and trailing edges of said copy are sensed;

signal providing means for providing during said transmit mode period equal duration synchronizing pulses at a first frequency;

copy drive means energizable during said transmit mode for pulling said copy through said input means whereby successive strips of said copy are exposable through a scan station of said input means;

scan means responsive to each synchronizing pulse for scanning the exposed copy strip from one end thereof to an opposite end between successive synchronizing pulses and for providing video signals in response to data on said scanned strip;

means including timing means and modulator means for modulating carrier signals at a first carrier frequency with said synchronizing pulses during a first interval of said transmitter mode period and for modulating carrier signals at a second carrier frequency with at least said video signals during the rest of said transmitter mode period, said timing means further including means for activating said modulating means for a second interval following said transmitter mode period to provide carrier signals at said first carrier frequency and for activating said copy drive means for a third interval following said transmitter mode period so that said copy is fully pulled by said copy drive means through said input means; and means for transmitting the output signals from said modulator means; and a receiver unit comprising;

a source of modulated light;

a print unit including light sensitive paper, an aperture defining a print station and paper drive means for driving paper past said print station so as to expose successive strips thereof in said print station;

scan means for scanning each paper strip exposed in said print station from one end thereof to an opposite end in a direction perpendicular to the paper drive direction so as to deflect light from said source thereto;

receiver means for receiving the signals transmitted to said receiver unit for defining a receiver mode period as long as carrier signals of either said first carrier frequency or said second carrier frequency are received;

signal providing means for providing locally generated equal duration synchronizing pulses at said first frequency;

demodulation means for demodulating said carrier signals;

synchronizing means for utilizing the synchronizing pulses received during said first interval and the locally generating synchronizing pulses to control said signal providing means to provide said locally generated synchronizing pulses in time coincidence with the received synchronizing pulses;

scan control means for controlling in response to each locally generated synchronizing pulse said scan means to scan said paper from said one end thereof to the appropriate end during the interval between synchronizing pulses;

means for activating said paper drive means during at least the period carrier signals of said second carrier frequency are received;

means for modulating the light of said source with the received video signals; and paper developing means for developing said light exposed paper following the period during which carrier signals of said second carrier frequency are received.

10. A facsimile system of the type described in claim 9 wherein the source of light in said receiver unit is a laser.

11. A facsimile system of the type described in claim 9 said input means of said transmitter unit include a light source of illuminating the paper strips exposed in said scan station and wherein the transmitter unit scan means comprise galvanometer means, sweep signal means and a photomultiplier, said sweep signal means being responsive to each synchronizing pulse for controlling the galvanometer means to reflect light modulated by data on the exposed copy strip to said photomultiplier which provides said video signals in response to the light intensity directed thereto.

12. A facsimile system of the type described in claim 11 wherein said galvanometer means includes a rotatable light reflecting mirror and said sweep means in response to each synchronizing pulse rotates said mirror to a first position in which light from one end of said scan station is reflected to said photomultipler, and in the period between pulses linearly rotates said mirror from said first position to a second position in which the mirror reflects light from an opposite end of said scan station to said photomultiplier.

13. A facsimile system of the type described in claim 12 wherein said light source in the transmitter unit input means is positioned on one side of said scan station and said input means further including reflecting means for enhancing the amount of light reflected by the copy strip exposed in said scan station.

14. In a facsimile system a transmitter unit comprising:

a scan unit adapted to receive a data-containing copy, including means for sensing the leading and trailing edges of said copy, energizable copy drive means for pulling said copy through a scan unit so as to expose successive strips of the copy at a scan station defined in said scan unit;

means for defining a transmitter mode period extending from the time the copy leading edge is sensed until the time the copy trailing edge is sensed;

timing means for defining a first interval of said transmitter mode period;

signal generating means for providing equal duration sychronizing pulses at a selected scan frequency during at least said first interval;

converting means including scan means and video signal producing means responsive to each synchronizing pulse for scanning the exposed copy strip from one end thereof to an opposite end and to produce video signals representing the scanned data on said strip;

modulator means for modulating carrier signals of a first carrier frequency with said synchronizing pulses during said first interval, and for modulating carrier signals of a second carrier frequency with at least said video signals during the rest of said transmitter mode period; and means for energizing said copy drive means during said transmitter mode period and for a selected interval following it.

15. In a facsimile system as described in claim 14 wherein said modulator means is further energizable following said transmitter mode period for a selected interval to provide unmodulated carrier signals of a selected carrier frequency.

16. In a facsimile system as described in claim 14 wherein said scan unit includes light means for illuminating the strip of copy exposed in said scan station and said scan means include galvanometer means for scanning said strip from an end thereof to an appropriate end in response to each synchronizing pulse, so as to reflect light modulated by the data on said strip in a selected direction and said video signals producing means comprises light sensitive means for receiving the modulated light from said galvanometer means to produce said video signals in response thereto.

17. In a facsimile system as descirbed in claim 16 wherein said scan means include sweep signal generating means responsive to each synchronizing pulse for controlling said galvanometer means during the synchronizing pulse duration to reflect light from said scan station first end and for providing said galvanometer means with a sweep control signal which increases substantially linearly following the synchronizing pulse and before the start of the next synchronizing pulse so that said galvanometer means linearly scan said copy strip from the scan station first end to an opposite end.

18. In a facsimile system as described in claim 17 wherein said video signal producing means comprises a photomultiplier and said system further includes means for controlling the sensitivity of said photomultiplier during selected portions of the linearly increasing sweep control signal.

19. In a facsimile system as described in claim 18 wherein the light means in said scan unit is an elongated lamp positioned on one side of said scan station and said scan unit further includes a light reflector for enhancing the illumination of each exposed strip.

20. In a facsimile system as described in claim 17 wherein said galvanometer means comprises a galvanometer with a rotatable light reflecting mirror and said sweep signal generating means control said mirror to rotate to a first position during the duration of each synchronizing pulse and further control said mirror to rotate linearly from said first position to a second postion during each interval between synchronizing pulses.

21. In a facsimile system as described in claim 20 wherein said modulator means is further energizable following said transmitter mode period for a selected interval to provide unmodulated carrier signals of a selected carrier frequency.

22. In a facsimile system as described in claim 21 wherein the light means in said scan unit is an elongated lamp positioned on one side of said scan station and said scan unit further includes a light reflector for enhancing the illumination of each exposed strip.

23. In a facsimile system as described in claim 21 wherein said video signal producing means comprises a photomultiplier and said system further includes means for controlling the sensitivity of said photomultiplier during selected portions of the linearly increasing sweep control signal.

24. In a receiver unit of a facsimile system in which signals including video signals are received, the video signals representing data on an original copy, a facsimile of which is to be produced in said receiver unit, an arrangement comprising:

input means for receiving during a first fixed period synchronizing pulses at a selected frequency and for receiving said synchronizing pulses and video signals between said synchronizing pulses during a second variable period following said first period;

a print unit including a light exposable paper, paper drive means for moving said paper past a print station at which light is reflectable to expose said paper;

means for energizing said paper drive means to drive said paper past said print station during at least the second period when said video signals are received;

signal generating means for providing locally generated synchronizing pulses at said selected frequency;

synchronizing means responsive during said first period to said received synchronizing pulses and said locally generated synchronizing pulses for controlling said signal generating means to provide said locally generated pulses in synchronism with said received synchronizing pulses;

light source means responsive to said video signals for providing a beam of light modulated thereby;

scan means responsive to said locally generated synchronizing signals for exposing the paper passing said print station from one end thereof to an appropriate end with the modulated light from said light source means during the intervals between successive synchronizing pulses; and means for controlling the unmodulated intensity of the beam of light from said light source means during the duration of each synchronizing pulse received during said second period.

25. In a receiver unit of a facsimile system as described in claim 24 wherein said locally generated synchronizing pulses are of equal durations and said scan means includes a galvanometer having a rotatable light reflecting mirror and sweep means responsive to each synchronizing pulse for rotating the mirror during the duration of each synchronizing pulse to a first position whereby light from said source is reflected by the mirror to one end of said print station and for linearly rotating the mirror during the interval between successive synchronizing pulses, from said first position toward a second position in which light from the mirror is reflected to an opposite end of said print station thereby exposing paper passing through said print station with modulated light as said mirror rotates from said first position to the second position.

26. In a receiver unit of a facsimile system as described in claim 24 further including means for developing said light exposed paper only after it is exposed by light modulated by all the video signals received during said second period.

27. In a receiver unit of a facsimile system as described in claim 26 wherein said light source means is a laser.

28. In a receiver unit of a facsimile system in which signals including video signals are received, the video signals representing data on an original copy, a facsimile of which is to be produced in said receiver unit, an arrangement comprising:

input means for receiving during a first fixed period synchronizing pulses at a selected frequency and for receiving synchronizing pulses and video signals between said synchronizing pulses during a second variable period following said first period;

a print unit including a light exposable paper, paper drive means for moving said paper past a print station at which light is reflectable to expose said paper;

means for energizing said paper drive means to drive said paper past said print station during at least the second period wehn said video signals are received;

signal generating means for providing locally generated synchronizing pulses at said selected frequency;

synchronizing means responsive during said first period to said received synchronizing pulses and said locally generated synchronizing pulses for controlling said signal generating means to provide said locally generated pulses in synchronism with said received synchronizing pulses;

a laser responsive to said video signals for providing a beam of light modulated thereby;

scan means responsive to said locally generated synchronizing signals for exposing the paper passing said print station from one end thereof to an appropriate end with the modulated light from said light source means during the intervals between successive synchronizing pulses; and means for utilizing the synchronizing pulses received during said second period to control the laser's unmodulated beam intensity.

29. In a receiver unit of a facsimile system in which signals including video signals are received, the video signals representing data on an original copy, a facsimile of which is to be produced in said receiver unit, an arrangement comprising:

input means for receiving during a first fixed period synchronizing pulses at a selected frequency and for receiving video signals during a second variable period following said first period;

a print unit including a roll of light exposable paper, paper drive means for moving the leading portion of said paper roll past a print station at which light is reflectable to expose said paper;

means for energizing said paper drive means to drive said paper past said print station during at least the second period when said video signals are received;

signal generating means for providing locally generated synchronizing pulses at said selected frequency;

synchronizing means responsive during said first period to said received synchronizing pulses and said locally generated synchronizing pulses for controlling said signal generating means to provide said locally generated pulses in synchronism with said received synchronizing pulses;

light source means responsive to said video signals for providing a beam of light modulated thereby; and scan means responsive to said locally generated synchronizing signals for exposing the paper passing said print station from one end thereof to an appropriate end with the modulated light from said light source means during the intervals between successive synchronizing pulses;

cutting means for severing the portion of the paper exposed to said light from the rest of said roll after at least said second period; and developing means for developing the paper which was exposed to said light, only after it was severed by said severing means.

30. In a receiver unit of a facsimile system as described in claim 29 wherein said locally generated synchronizing pulses are of equal duration and said scan means include a galvanometer having a rotatable light reflecting mirror and sweep means responsive to each synchronizing pulse for rotating the mirror during the duration of each synchronizing pulse to a first position whereby light from said source is reflected by the mirror to one end of said print station and for linearly rotating the mirror from said first position toward a second position in which light from the mirror is reflected to an opposite end of said print station thereby exposing paper passing through said print station with modulated light as said mirror rotates from said first position to the second position.

31. In a receiver unit of a facsimile system as described in claim 30 wherein said light source means is a laser.

32. In a receiver unit of a facsimile system as described in claim 31 wherein said synchronizing pulses are received during said second period with video signals being received between synchronizing pulses and means for utilizing the synchronizing pulses received during said second period to control the laser's unmodulated beam intensity.

33. In a receiver unit of the type in which carrier signals of a first frequency are received during a variable length period, at least some of said carrier signals being modulated by video signals representing data for producing a readable paper copy containing said data, said variable length period being substantially equal to the period requiring for a copy containing said data to pass through a sensor in a transmit unit from which said carrier signals are received, an arrangement comprising:

a print unit defining a print station and including a roll of energy sensitive paper and a paper drive motor for driving paper extending from said roll past said print station;

means for energizing said paper drive motor to drive said paper past said print station during said variable length period;

means including energy source means responsive to said video signals for directing energy modulated by said video signals to said print station to sensitize said paper;

cut means for severing the paper which passed said print station from said roll at the end of said variable length period; and development means for developing the energy sensitized paper only after said paper was severed from said roll.

34. In a receiver unit as described in claim 33 wherein said development means include drive means for driving the severed paper through said development means at a rate which is independent of the rate at which the paper is driven past said print station.

35. In a receiver unit as described in claim 34 further including means disposed between said cut means and said development means for inhibiting the paper from extending to said drive means of said development means, during said variable length period and for extending said severed paper to said drive means of said development means after said paper was severed from said roll.

36. In a receiver unit as described in claim 35 further including loop forming means including a moving member for enabling the paper passing through said print station to reach said inhibiting means and for shaping the paper inhibited by said inhibiting means from extending to the drive means of said development means to form a loop therein, with said moving member moving from a fixed position to enable said loop to be formed.

37. In a receiver unit as described in claim 36 wherein said energy is light.

* * * * *